United States Patent [19]

Cords et al.

[11] Patent Number: 5,346,289

[45] Date of Patent: Sep. 13, 1994

[54] CONTROL VALVE FOR HYDRAULIC BRAKING SYSTEM

[75] Inventors: Frederick W. Cords, Good Thunder; David Frye, North Mankato, both of Minn.

[73] Assignee: Total Quality Enterprises, Inc., Mankato, Minn.

[21] Appl. No.: 969,877

[22] Filed: Oct. 30, 1992

[51] Int. Cl.$^5$ ............................................. B60T 7/20
[52] U.S. Cl. ........................................ 303/7; 188/150
[58] Field of Search .................. 188/112 A, 125, 126, 188/142, 149, 150, 175, 134, 112 R; 303/7, 20; 137/115, 901

[56] References Cited

U.S. PATENT DOCUMENTS

| | | | |
|---|---|---|---|
| Re. 30,550 | 3/1981 | Reise | 188/112 A |
| 3,342,292 | 9/1967 | Wherry | 188/112 A |
| 3,682,278 | 8/1972 | Wherry et al. | 188/112 A |
| 3,796,287 | 3/1974 | Kolm | 188/112 A |
| 3,856,362 | 12/1974 | Howard | 303/7 |
| 3,881,577 | 5/1975 | Wherry et al. | 188/112 A |
| 3,951,464 | 4/1976 | Donahue et al. | 303/7 |
| 3,955,652 | 5/1976 | Nilsson et al. | 188/112 R |
| 3,955,911 | 12/1976 | Kasselmann et al. | 303/2 |
| 3,989,270 | 11/1976 | Henderson | 280/478 A |
| 4,099,790 | 7/1978 | Hipps | 303/7 |
| 4,196,936 | 8/1980 | Snyder | 303/20 |
| 4,223,766 | 9/1980 | Huetsch et al. | 188/112 R |
| 4,239,252 | 12/1980 | Huetsch et al. | 280/446 R |
| 4,243,271 | 1/1981 | Dwyer | 303/7 |
| 4,249,643 | 2/1981 | Yoder | 188/112 R |
| 4,343,517 | 8/1982 | Levington | 303/7 |
| 4,402,553 | 9/1983 | Hipps | 303/3 |
| 4,453,620 | 6/1984 | Angus et al. | 188/112 R |
| 4,600,089 | 7/1986 | Wilson | 188/112 R |
| 4,635,758 | 1/1987 | Beard, Jr. | 188/3 H |
| 4,671,578 | 6/1987 | Rothen et al. | 303/15 |
| 4,735,463 | 4/1988 | Rhoton et al. | 303/16 |
| 4,787,487 | 11/1988 | Conradi | 188/328 |
| 4,840,256 | 6/1989 | Webb | 188/112 R |
| 4,842,340 | 6/1989 | Kullmann et al. | 303/7 |
| 4,899,642 | 2/1990 | Hwang | 91/510 |
| 4,982,999 | 1/1991 | Rossigno et al. | 303/9.63 |
| 4,993,738 | 2/1991 | Bennett | 280/432 |
| 5,036,956 | 8/1991 | Genier | 188/59 |
| 5,040,816 | 8/1991 | Goettker | 280/446.1 |
| 5,051,053 | 9/1991 | Groeneweg | 414/483 |

FOREIGN PATENT DOCUMENTS

| | | | |
|---|---|---|---|
| 1315884 | 12/1962 | France | 188/112 R |
| 1646928 | 5/1991 | U.S.S.R. | 188/112 R |

OTHER PUBLICATIONS

Hydro-Act Model TA-6 Hydraulic Trailer Brake Actuators, Toledo Stamping & Manufacturing Co. (2 pages).

Hydro Braking-Act "TB" Series Hydraulic Trailer Brake Actuators, Toledo Stamping & Manufacturing Co. (3 pages).

Primary Examiner—Robert J. Oberleitner
Assistant Examiner—Alfred Muratori
Attorney, Agent, or Firm—Faegre & Benson

[57] ABSTRACT

A hydraulic braking system for a towed vehicle provides actuation of the hydraulic pump motor of the towed vehicle responsive to an electrical switch which is closed upon application of the brake pedal of the towing vehicle. However, even after actuation of the hydraulic pump, the towed vehicle brakes are only able to be applied in response to sensed relative movement of the towing and towed vehicle toward each other. A break-away switch sets the trailer brakes in the event of accidental separation of the towed vehicle from the towing vehicle. The control valve may be used in other situations to control a hydraulic pump and associated hydraulic braking system.

17 Claims, 2 Drawing Sheets

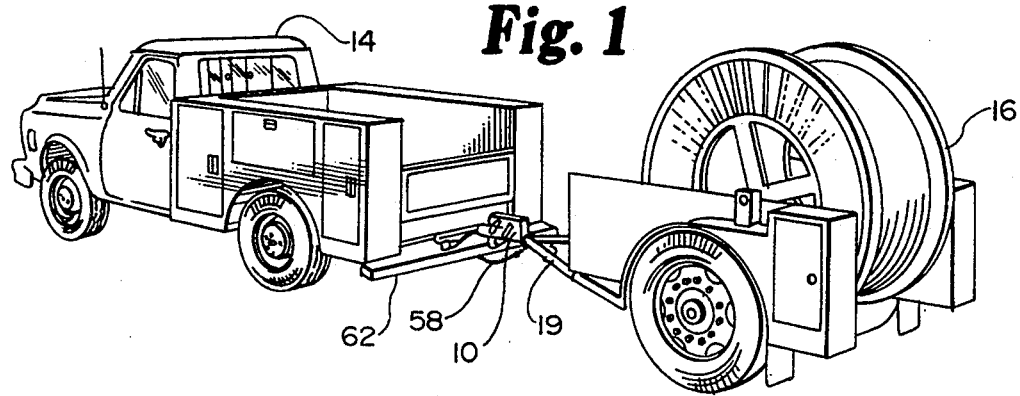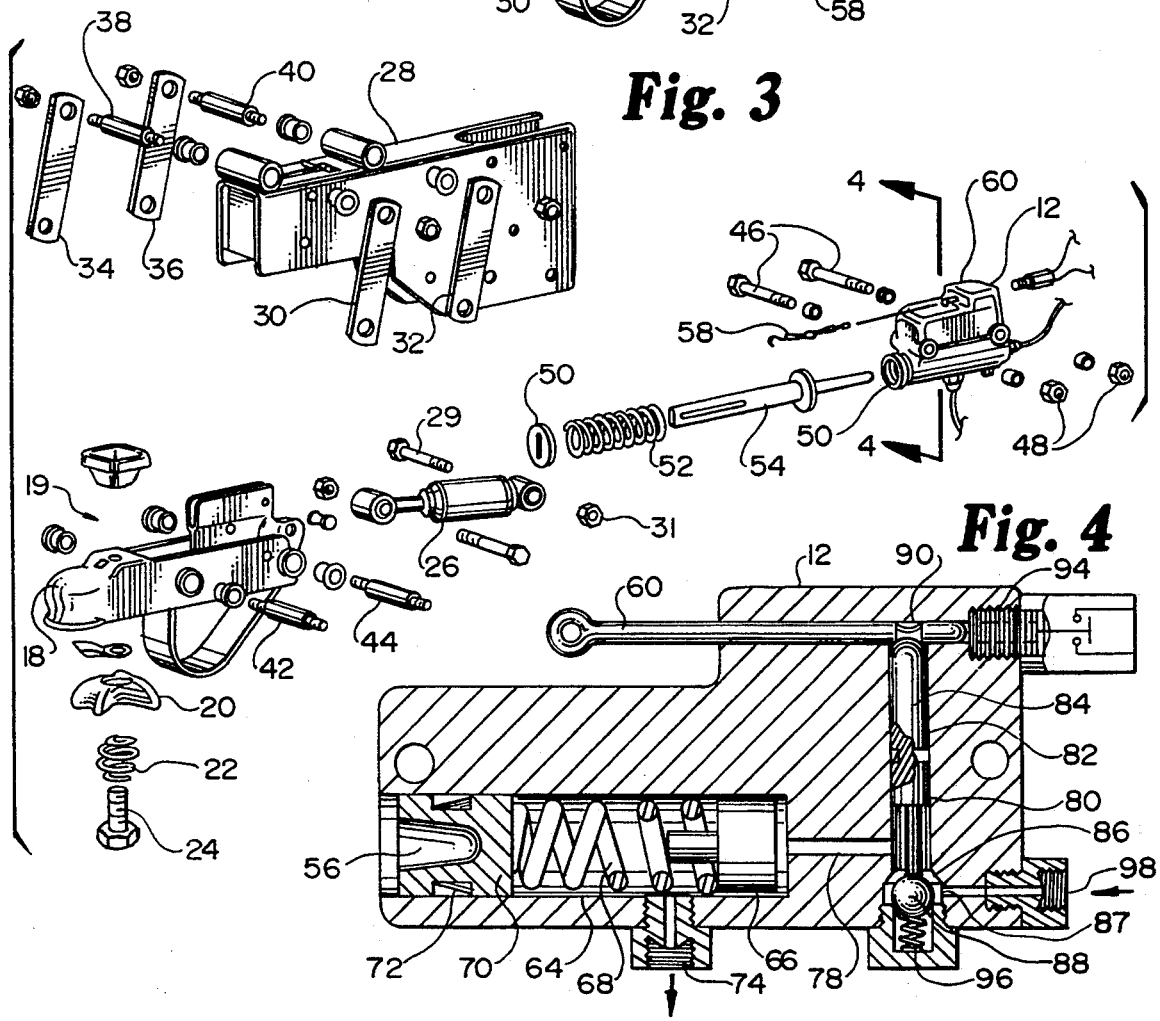

CONTROL VALVE FOR HYDRAULIC BRAKING SYSTEM

FIELD OF THE INVENTION

This invention provides a control valve for a hydraulic pump of a hydraulic braking system which is operationally interposed between the pump and the braking system. This control valve can be used to provide an improved braking system for a towed vehicle. Specifically, in this improved braking system for a towed vehicle, the hydraulic pump motor of the towed vehicle is initially actuated responsive to an electrical switch which is closed upon application of the brake pedal of the towing vehicle. At that point, although the pump is pumping hydraulic fluid, the towed vehicle brakes are only able to be applied in response to sensed relative movement of the towing and towed vehicle toward each other, such as backing up or deceleration of the towing vehicle relative to the towed vehicle.

BACKGROUND OF THE INVENTION

Most recreational and utility trailers, are equipped with hydraulic brakes which are generally actuated responsive to sensed approach of the towed and towing vehicles toward each other, such as deceleration or backing up of the towing vehicle relative to the towed vehicle. Such brakes are known generally as surge brakes. During deceleration of the towing vehicle, such as in slowing speed or in coming to a full stop, it is desirable to have the trailer vehicle brakes be applied together with those of the towing vehicle. However, when these vehicles approach each other due to backing up of the towing vehicle, simultaneous application of the trailer brakes will impede maneuverability.

Accordingly, it is an object of the present invention to provide a braking system in which the power generation system for the trailer brakes, that is the trailer hydraulic pump, is enabled responsive to an electrical signal from the towing vehicle, such as application of the towing vehicle brake pedal.

Braking systems are currently available in which both towing and trailer vehicle brakes are controlled responsive to a signal from the towing vehicle. Thus, U.S. Pat. No. 4,402,553, Hipps, describes hydraulic brakes for a towed vehicle, in which an electro-magnet variable valve in the towed vehicle provides the responsive braking pressure by employing an electric current signal generated by a pedal force sensor in the towing vehicle to create an electromagnetic force balanced against the hydraulic pressure present in the towed vehicle brakelines. The towed vehicle is slowed without any hydraulic connection between the two vehicles. The device, however, does not sense deceleration of the towing vehicle in combination with the application of brakes in the towing vehicle.

U.S. Pat. No. 3,951,464, Donahue, relates to a truck-trailer brake system utilizing a hydraulic trailer brake system in which the hydraulic pump is driven by an electric motor carried by the trailer, but the pump is controlled from the truck, so that only simple electrical connections between the truck and the trailer are required. However, the Donahue system does not include an additional sensor responsive to truck deceleration as does the present inventive system.

BRIEF DESCRIPTION OF THE INVENTION

The present invention provides a control valve for a hydraulic pump of a hydraulic braking system which is operationally interposed between the pump and the braking system. This invention also provides a braking system for a towed vehicle which comprises a braking power generation means for the brakes of a towed vehicle. The braking power generation means is adapted and arranged to operate in response to a control signal from a towing vehicle to which the towed vehicle is operatively coupled. The control signal indicates that the towing vehicle brakes have been applied.

The braking system also includes means for coupling power from the braking power generating means to the towed vehicle brakes, so that the towed vehicle brakes can be applied only in response to a certain operating condition of the towing vehicle. Typically the braking power generation means of the towed vehicle is a standard hydraulic pump. The control signal is typically an electrical signal which indicates that the towing vehicle brake pedal has been depressed, which, in most vehicles, simultaneously actuates the towing vehicle brake lights. The operating condition of the towing vehicle which will then enable application of the trailer brakes is relative approach of the towing vehicle and the towed vehicle toward each other, such as during deceleration of the towed vehicle relative the towing vehicle.

The power coupling means includes a control valve which operatively connects the hydraulic pump to the towed vehicle brakes when the valve is in an open condition. The power coupling means also includes a sensor means for detecting applied force, such as that applied by the deceleration of the towing vehicle relative to the towed vehicle. The sensor means then operates the control valve means to allow hydraulic fluid from the hydraulic pump to apply pressure to the towed vehicle brakes responsive to a predetermined force. The predetermined force is generally deceleration of the towing vehicle relative to the towed vehicle.

BRIEF DESCRIPTION OF THE DRAWINGS

FIG. 1 is a perspective view of the trailer brake actuation system of the present invention in position between a light weight truck and a utility trailer;

FIG. 2 is a perspective view of the hitch assembly shown in FIG. 1 with the structure partially cut away to expose the brake actuation system mechanism of the present invention;

FIG. 3 is an exploded view of the trailer brake actuation system;

FIG. 4 is a sectional view of the control valve of FIG. 3 taken along line 4—4, with a break away detection pin in position maintaining a break-away switch in open position;

DETAILED DESCRIPTION OF THE INVENTION

Figure 5:
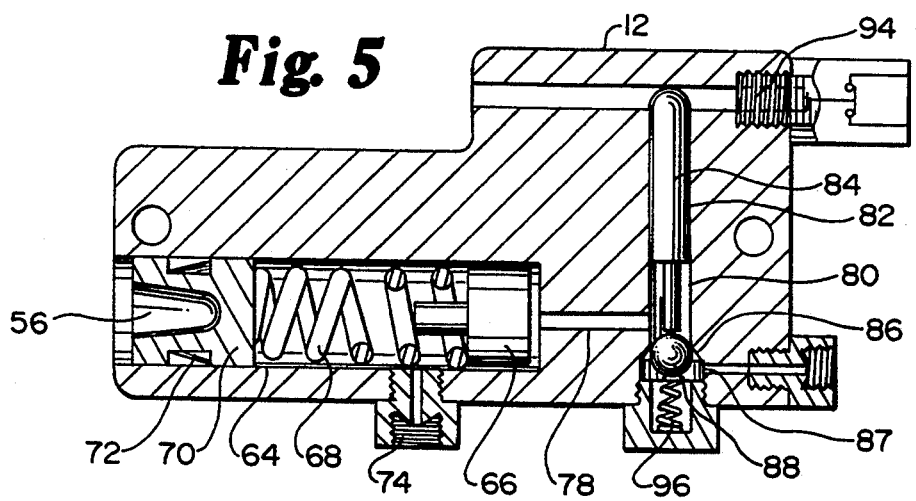
FIG. 5 is a sectional view of the control valve of FIG. 2 taken along line 4—4, with a breakaway detection pin withdrawn allowing closing of the break-away switch.

FIGS. 1, 2 and 3 show a trailer hitch using brake actuation system 10 of the present invention housed within control valve 12. FIGS. 1 and 2 illustrate brake actuation system 10 in position between a towing vehicle, in this instance a light weight truck 14, and a towed vehicle, utility trailer 16. FIG. 3 illustrates an exploded view of trailer brake actuation system 10, showing the various components thereof in relative assembly positions. Trailer brake actuation system 10 may be provided by modification of a standard brake actuation system, such as Hydro-Act Model TA 6 Brake Actuator, available from Toledo Stamping and Manufacturing Co. of Toledo, Ohio.

Ball receptacle 18 of hitch 19 attaches to conventional ball hitch (not shown) on truck 14 by means of ball clamp 20, spring 22 and tensioner bolt 24. Stabilizer shock 26 is interposed between hitch 19, to which it is connected by axle 27, and control valve housing 28, to which it is connected by bolt 29 and nut 31. Hinge arms 30, 32, 34, 36 hingedly connect control valve housing 28 to hitch 19 by means of hinge axles 38, 40 through control valve housing 28 and hinge axles 42, 44 through hitch 19. Control valve 12 (the interior working of which will be described in further detail hereinafter) is retained within control valve housing 28 by means of bolts 46 and nuts 48. Endcap 50 and spring 52 encase push rod 54 to confront recess 56 of control valve 12. Stabilizer shock 26 confronts endcap 50 in a manner to be explained further herein. Break-away chain 58 is positioned between break-away detection pin 60 and bumper 62 of truck 14.

It is to be understood that all parts of the trailer brake actuation system 10 are designed and function in the same manner as a standard brake actuation system, such as the Hydro-Act Model TA 6 Brake Actuator, referred to above, with the exception of control valve 12.

Turning now to FIGS. 3, 4 and 5, there is illustrated the interior structure of control valve Control valve 12 may be used to control a hydraulic pump and associated hydraulic braking system. Herein, it will be specifically disclosed in regard to use between a towed and towing vehicle to control the towed vehicle pump and braking system and also in regard to use in a forklift truck or similar vehicle to sense an empty operator seat condition. Other uses will be obvious to those of skill in this area.

Piston channel 64 is machined within control valve 12 to receive head 66, spring 68, and piston 70, which is slidingly retained within piston channel 64 by seal 72. Piston 70 is provided with recess 56. Piston channel 64 is also provided with screw-fit hydraulic outlet fitting 74 to provide an outlet for hydraulic fluid returning through hydraulic fluid reservoir 75 to hydraulic pump 76, illustrated schematically in FIGS. 6 and 7. Piston channel 64 is also provided with fluid channel 78, providing fluid flow communication between piston channel 64 and ball valve channel 80, machined within control valve 12. Ball valve channel 80 is machined with smaller diameter section 82, sized to closely accommodate push pin 84, tapering outward at shoulder 86 to larger diameter section 87, sized to accommodate ball valve 88. Push pin 84 abuts against constriction 90 in break-away detection pin 60.

When break-away detection pin 60 is in its normal engaged position, as shown in FIG. 4, it presses against break-away switch 94, maintaining break-away switch 94 in open position. In break-away switch 94 open position, ball valve 88 is pressed upon spring 96 so that hydraulic inlet fitting 98 allows fluid flow communication from hydraulic pump 76 through ball valve channel 80, fluid channel 78, piston channel 64, hydraulic outlet fitting 74, and hydraulic fluid reservoir 75. When break-away detection pin 60 is removed, as when trailer 16 becomes unintentionally separated from truck 14, break-away switch 94 is allowed to close, as shown in FIG. 5. The effect of operation of break-away switch 94 will be explained further herein in relation to the electrical schematic diagram of FIG. 6. Removal of break-away detection pin 60 also allows ball valve spring 96 to push ball valve 88 to seat against shoulder 86, thus restricting fluid flow from hydraulic inlet fitting 98.

Figure 6:
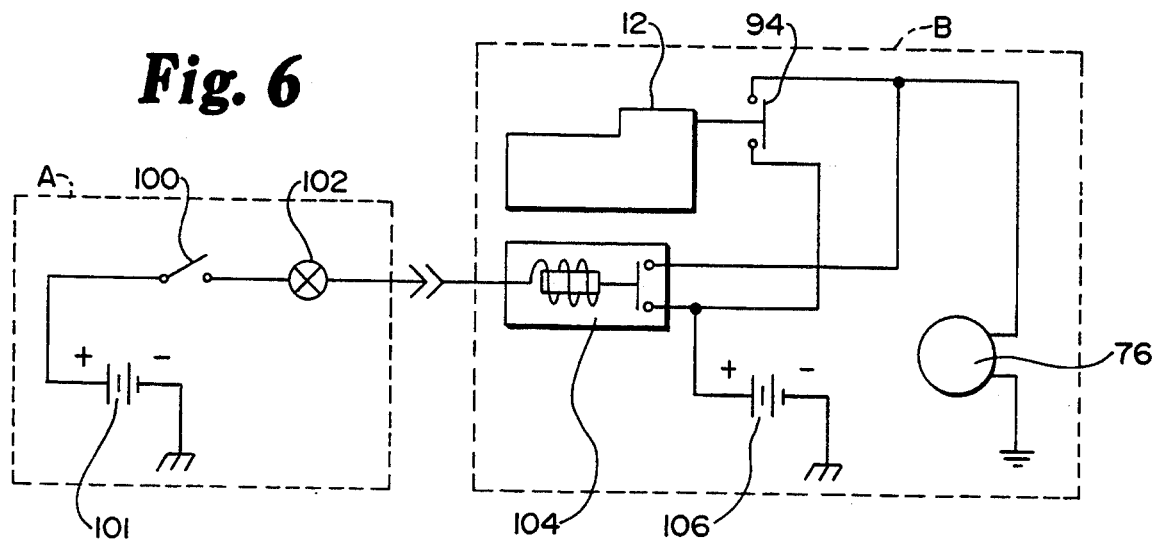
FIG. 6 is an electrical schematic diagram of the present trailer brake system.
Figure 7:
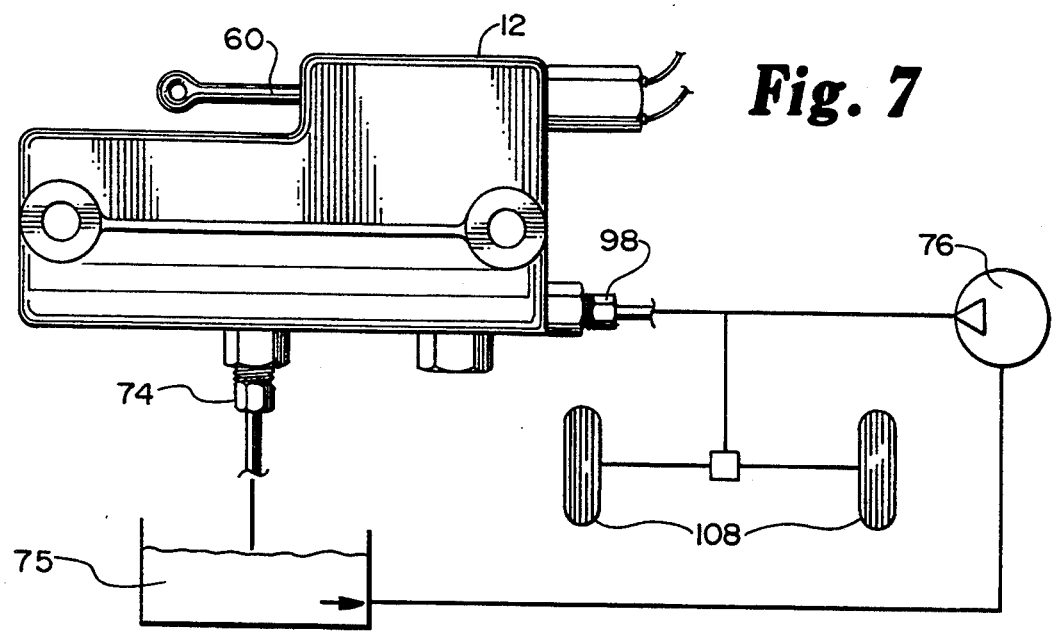
FIG. 7 is a hydraulic schematic diagram of the present trailer brake system.

Turning to FIG. 6, an electrical schematic diagram of trailer brake system 10 is illustrated. Block A represents the electrical schematic of truck 14 and Block B represents the electrical schematic of trailer 16. Brake switch 100 of truck 14, powered by truck battery 101, when depressed in the normal manner of applying truck 14 brakes, activates brake light 102, and in the present invention also signals solenoid switch 104, powered by trailer battery 106, to turn on hydraulic pump 76. Hydraulic pump 76 then provides hydraulic fluid to control valve 12, according to the relative positions of ball valve 88 and head 66 within their respective fluid channels, and according to the position of break-away switch 94 and associated ball valve 88.

The operation of the novel trailer braking system of the present invention is described as follows. When the driver of truck 14 depresses brake switch 100, brake light 102 and solenoid switch 104 are both activated. Activation of solenoid switch 104 turns on hydraulic pump. However, trailer 16 brakes are not activated until there is relative movement truck 14 and trailer 16 toward each other. Relative movement of truck 14 and trailer 16 toward each other urges stabilizer shock 26 to press on endcap 50, so that push rod 54 presses on piston 70 through recess 56 to seat head 66 against fluid channel 78, thus 10 restricting fluid flow to hydraulic outlet fitting 74 and providing hydraulic braking pressure to trailer 16 brakes within wheels 108.

In the event that trailer 16 becomes accidentally separated from truck 14, pin 60 is pulled out, causing break-away switch 94 to close, turning pump 76. Simultaneously, ball valve 88 is urged upward by spring 96 to seat against shoulder 86, thus restricting fluid flow to hydraulic outlet fitting 74 and providing hydraulic braking pressure to trailer 16 brakes until pump 76 is manually turned off.

Having thus described my invention, it is not my intention that this invention should be limited in any way than as defined by the appended claims.

What is claimed is:

1. A braking system for a towed vehicle having brakes and configured to be coupled to a towing vehicle of the type having brakes and means for providing a brake signal indicative of brake actuation, the braking system comprising:

a hydraulic pump configured to receive the towing vehicle brake signal, for providing pressurized hydraulic fluid for the towed vehicle brakes in response to actuation of the towing vehicle brakes;

hydraulic valve means operatively connecting the hydraulic pump to the towed vehicle brakes for hydraulic fluid flow; and a piston in the hydraulic valve means responsive to forces between the towed and towing vehicles, for modulating hydraulic fluid flow from the hydraulic pump to the towed vehicle brakes as a function of forces between the towed and towing vehicles.

2. The system of claim 1, wherein the brake signal is an electrical signal indicative of towing vehicle brake actuation.

3. The system of claim 2, wherein the brake signal is a signal used to actuate the towing vehicle brake lights.

4. The system of claim 1, wherein the coupling means includes means for coupling power from the braking power generating means to the towed vehicle brakes as a function of the relative approach of the towed and towing vehicles.

5. The system of claim 1, wherein the coupling means includes means for coupling power from the braking power generating means to the towed vehicle brakes as a function of deceleration of the towing vehicle relative to the towed vehicle.

6. The system of claim 1 and further including break-away switch means coupled to the hydraulic pump and the towing vehicle for sensing unintended uncoupling of the towed vehicle from the towing vehicle, and actuating the hydraulic pump to apply the towed vehicle brakes when uncoupling is sensed.

7. A control valve comprising:
a block housing formed with a fluid flow channel between a fluid flow inlet and a fluid flow outlet, the channel further including:
(a) first fluid flow controlling means responsive to external pressure for modulating flow between the inlet and outlet, and
(b) second fluid flow controlling means responsive to a removable break-away pin for preventing flow between the inlet and the outlet when the break-away pin is removed.

8. A hydraulic braking system for a towed vehicle having a control valve according to claim 7, a brake and a hydraulic pump, and configured to be connected to a towing vehicle, wherein:
the fluid inlet receives fluid flow from the pump and the fluid outlet conducts fluid flow to return to the pump; and
the valve further includes a pump actuated by the break-away pin.

9. The braking system according to claim 8, wherein:
the pump is operational only on electrical connection by one of:
an externally applied electrical connection, or
actuating the switch by removal of the break-away pin.

10. The braking system according to claim 9, wherein the braking system is enabled by hydraulic pressure provided by restricting flow from the inlet the outlet by one of:
application of pressure to the first fluid flow controlling means; or
immediately upon removal of the pin.

11. The braking system according to claim 10, wherein the first fluid flow controlling means is a piston responsive to movement the towed and towing vehicles toward each other.

12. The braking system according to claim 10, wherein removal of the pin is caused by movement of the towed vehicle away from the towing vehicle, indicating breakaway of the towed vehicle from the towing vehicle.

13. The braking system according to claim 10, wherein the externally applied electrical connection is caused by depression of the towing vehicle brake pedal.

14. A hydraulic brake system for a towed vehicle having a brake and configured to be connected to a towing vehicle of the type having a brake and an electrical system for providing a brake signal upon actuation of the brake, the towed vehicle brake system including:
a tank for hydraulic fluid;
an electric pump configured for connection to the towing vehicle electrical system and hydraulically connected between the tank and brake, for providing pressurized hydraulic fluid in response to the brake signal; and
a pressure modulating valve having a modulating fluid flow path hydraulically connected between the electric pump and the tank, and a modulator piston responsive to forces between the towed and towing vehicles for modulating the flow of pressurized fluid through the modulating fluid flow path and thereby restricting the flow of pressurized hydraulic fluid to the tank and causing the brake to be actuated.

15. The hydraulic brake system of claim 14 and further including:
a break-away switch electrically connected to the electric pump and configured for interconnection to the towed vehicle, for actuating the electric pump when a break-away towed vehicle condition is sensed; and
a break-away valve between the towed vehicle brake and the modulating fluid flow path in the pressure modulating valve, and configured for interconnection to the towed vehicle, for closing a fluid flow path between the towed vehicle brake and modulating fluid flow path when a break-away towed vehicle condition sensed.

16. The hydraulic brake system of claim 15 wherein the break-away switch and break-away valve are mounted to the pressure modulating valve.

17. The hydraulic brake system of claim 16 and further including a break-away detection pin configured for interconnection to the towed vehicle and connected to the break-away switch and break-away valve.

* * * * *

UNITED STATES PATENT AND TRADEMARK OFFICE
CERTIFICATE OF CORRECTION

PATENT NO. : 5,346,289

DATED : September 13, 1994

INVENTOR(S) : Cords et al.

It is certified that error appears in the above-identified patent and that said Letters Patent is hereby corrected as shown below:

Column 5, line 40, after "pump" insert --electrical switch--

Column 5, line 50, after "inlet" insert --to--

Column 6, line 3, after "movement" insert --of--

Signed and Sealed this

Eleventh Day of July, 1995

Attest:

BRUCE LEHMAN

Attesting Officer     Commissioner of Patents and Trademarks